UNITED STATES PATENT OFFICE.

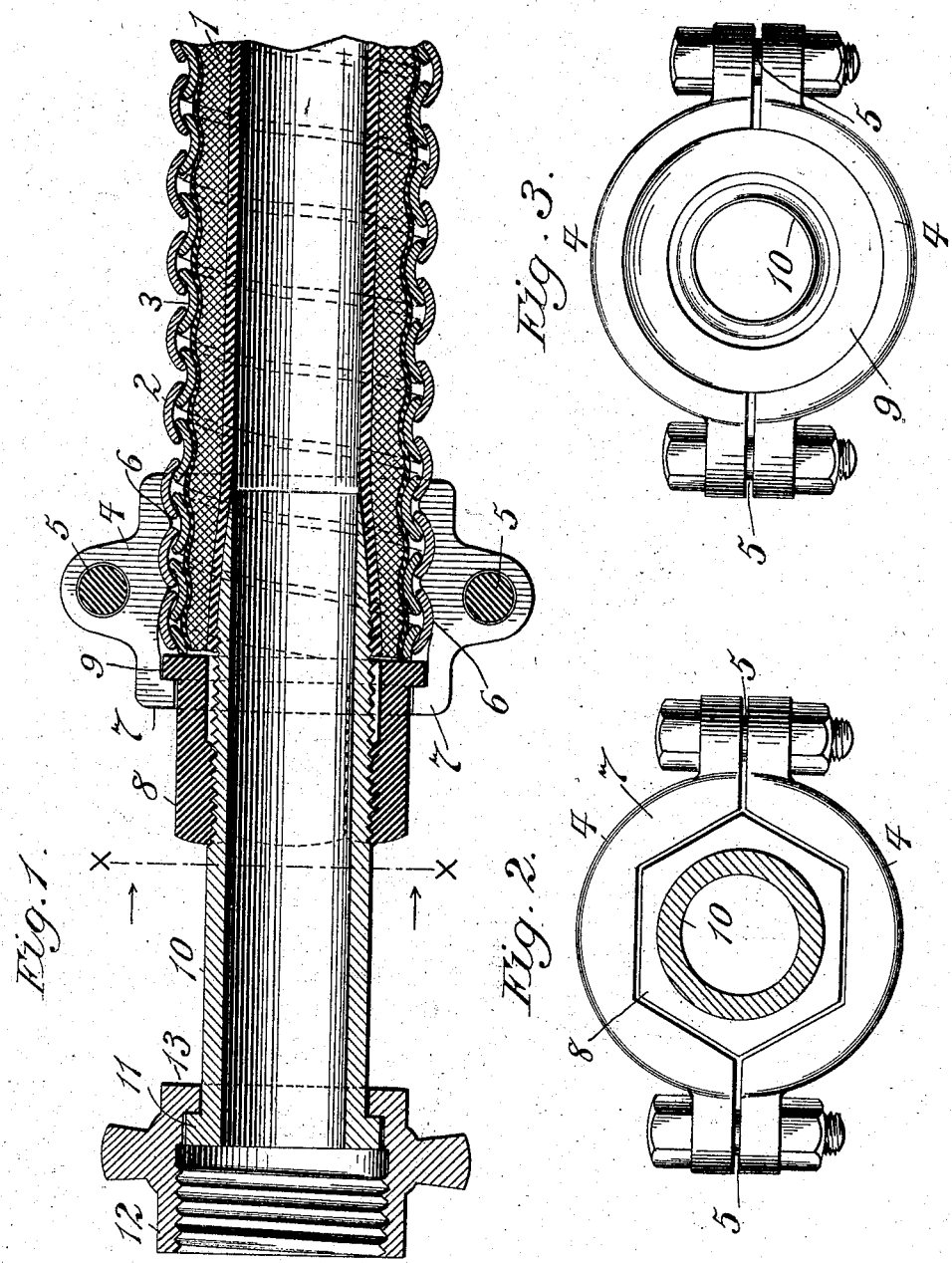

EDWIN T. GREENFIELD, OF MONTICELLO, NEW YORK.

COUPLING FOR ARMORED HOSE.

No. 806,135. Specification of Letters Patent. Patented Dec. 5, 1905.

Application filed October 5, 1904. Serial No. 227,314.

*To all whom it may concern:*

Be it known that I, EDWIN T. GREENFIELD, a citizen of the United States, residing at Monticello, in the county of Sullivan and State of New York, have made a new and useful Invention in Couplers for Armored Hose, of which the following is a specification.

My invention is directed particularly to an improvement upon a coupler for armored hose disclosed in a prior United States Patent No. 746,497, granted to me on the 8th day of December, 1903, and it has for its objects, first, to provide a coupler of the nature indicated which shall effect a stronger union between the parts coupled than was possible with the structural apparatus disclosed in the before-mentioned patent; second, to provide a coupler for armored hose which shall effect a metallic union between the armor of the hose and a cylindrical metallic coupling-sleeve extending into the end thereof and in such manner that the armor, the sleeve, and the intervening hose shall be firmly and securely bound together.

My invention will be fully understood by referring to the accompanying drawings, in which—

Figure 1 represents a longitudinal sectional view taken though the end of an armored hose and my novel form of coupler as applied thereto, one of the halves of the exterior coupling-ring being shown in elevational view and the bolts which unite the two halves of the same together in section. Fig. 2 is a transverse sectional view taken through Fig. 1 on the line X X and as seen looking thereat from left to right in the direction of the arrows. Fig. 3 is an end elevational view as seen looking at Fig. 1 from right to left upon the supposition that the hose has been removed.

The novel form of coupler disclosed in my before-mentioned patent while being effective in its operation was not found to be as effective as desirable when armored hose was to be coupled where extremly high pressures were to be utilized—such, for instance, as in connection with hydraulic mining, steam-drills, and the like—and this for the reason that the coupling was effected solely through externally-applied pressure which reached the limit when the armor-strips had been bound firmly together, while in the present improvement I have combined with the external half coupling-rings adjustable internal means and have so united the parts that the interior of the hose and the exterior of the armor are firmly held in the strongest possible relation through the agency of the intervening gripping action of the parts, as will be fully understood by referring to the accompanying drawings in detail and first to Fig. 1, in which—

1 represents a flexible hose, and 2 3 the spirally-arranged metal armor therearound, said armored hose being in every essential respect the same as that disclosed in a prior patent granted to me on the 8th day of December, 1903, and bearing No. 746,630. 4 4 represent the metallic half coupling-rings or exterior part of the coupler, the same being preferably of cast-steel screw-threaded interiorly at 6 6, with threads having the same relative pitch as that of the spirally-wound armor 2 3, 7 being an inwardly-projecting shoulder at one end of each of the two parts, the inner faces of said shoulders being in the nature of hexagonal walls, as clearly illustrated in Fig. 2. 5 5 are bolts for securing the half coupling-rings together. 10 is a cylindrical metallic coupling-sleeve of metal, provided at one end with a shoulder 11, adapted to bear against a corresponding shoulder 13 of a screw-threaded coupler 12 for securing the same to the male screw-threaded stationary end of a hydrant, water-pipe, steam-pipe, or the like, to which the hose is to be coupled. The other end of the hollow cylindrical coupling-sleeve 10 is cone-shaped, as shown, and is screw-threaded for a distance approximating one-half the length thereof, 8 being a hexagonal screw-threaded metallic coupling-nut adapted to be secured upon said sleeve and provided with a shoulder or ledge 9, adapted to take against the corresponding shoulders 7 of the two half coupling-rings 4 4, the arrangement being such that when the parts are put together the hexagonal-shaped nut fits accurately within the hexagonal walls of the shoulders 7.

The parts are put together as follows: The two half coupling-rings are secured in position about the ends of the armored hose with the screw-threads thereof surrounding the male screw-threads or armor-strips 2 3, the hexagonal nut being in position with its shoulder 9 resting, respectively, against the inner or adjacent end of the hose and the shoulders 7 in the manner shown. The bolts 5 are then secured in place and the nuts thereon turned until the two half coupling-rings firmly grip the hose and compress the armor securely therearound. The coupler 12 is then slipped upon the cylindrical coupling-sleeve 10 and the latter is driven forward by a pipe-wrench through the agency of the screw-threads upon the sleeve and in the nut 8 until the cone-shaped end enters to the desired extent the interior of the inclosed end of the hose, so that exterior pressure is effected between the cone-shaped end of the cylindrical coupling-sleeve and the armor and surrounding half coupling-rings, as will be apparent on inspection of Fig. 1 of the drawings, the pressure being such that when the parts are all firmly secured together the internal diameter of the coupling-sleeve 10 and hose to be coupled is substantially identical. The coupler 12 is then secured in position with a coupling-wrench upon the screw-threaded end of the hydrant or steam-pipe to which it is to be connected.

I do not limit my invention to the especial structural arrangement disclosed in the accompanying drawings, as obviously a number of the features thereof might be materially departed from and still come within the scope of my claims hereinafter made. To illustrate, instead of utilizing half coupling-rings this part may be cast in one integral piece having internal screw-threads corresponding to the pitch and dimensions of the screw-threaded armor 2 3 and a shoulder 7 like that disclosed in the drawings, and for the purpose of adapting this form of coupler for successive sections of armored hose it is obvious that it would only be necessary to so construct the cylindrical coupling-sleeve 10 that when the same is rotated with a pipe-wrench it would cause corresponding coupling-nuts 8 at its opposite ends to be advanced toward each other, said sleeve being correspondingly cone-shaped and provided with right and left screw-threads at its opposite ends

Having thus described my invention, what I claim, and desire to secure by Letters Patent of the United States, is—

1. Means for connecting a hose to a metallic coupler embracing a metallic coupling-sleeve having a shoulder at one end adapted to bear internally against the shoulder of the coupler and screw-threaded intermediate its ends; in combination with a screw-threaded metallic coupling-nut and a two-part coupling-ring, both the nut and the ring being provided with interlocking shoulders and the latter with means for firmly gripping the end of the hose between the end of the coupling-sleeve and the inner faces of the two-part ring.

2. Means for connecting a hose to a metallic coupler embracing a metallic coupling-sleeve shouldered at one end and cone-shaped at the other and screw-threaded intermediate its ends; in combination with a screw-threaded metallic coupling-nut adapted to be secured thereon and a two-part coupling-ring, said nut and ring being provided with interlocking shoulders and the latter with internal screw-threads and bolts and bolt-holes for gripping the end of an armored hose between it and the end of the cone-shaped sleeve.

3. A hose-coupler for a flexible hose provided with a screw-threaded armor embracing half coupling-rings screw-threaded interiorly and provided with a shoulder at one end; in combination with a coupling-sleeve cone-shaped at one end and screw-threaded upon its exterior surface; together with a nut screw-threaded interiorly to fit the screw-threads of the coupling-sleeve and having a shoulder adapted to bear against the shoulder of the coupling-ring, said half-rings being provided with bolt-holes and bolts for securing them together about the end of the hose, substantially as described.

4. A hose-coupler embodying two half coupling-rings screw-threaded interiorly and provided with bolt-holes for receiving bolts and a shoulder at one end; in combination with a cone-shaped coupling-sleeve screw-threaded at its cone-shaped end and a hexagonal screw-threaded nut provided with a shoulder adapted to bear against the shoulder of the half coupling-rings, the shoulders of the latter being provided with hexagonal surfaces adapted to surround and prevent the nut from turning when the coupling-sleeve is rotated, substantially as described.

In testimony whereof I have signed my name to this specification in the presence of two subscribing witnesses.

EDWIN T. GREENFIELD.

Witnesses:
C. J. KINTNER,
M. F. KEATING.